United States Patent [19]

Erwin

[11] Patent Number: 5,755,464
[45] Date of Patent: May 26, 1998

[54] SEGMENTED FLANGE STRUCTURE INCLUDING A SHIM

[75] Inventor: Roger D. Erwin, Danvers, Mass.

[73] Assignee: Erwin's LLC, Arlington, Mass.

[21] Appl. No.: 629,187

[22] Filed: Apr. 8, 1996

Related U.S. Application Data

[63] Continuation-in-part of Ser. No. 614,355, Mar. 12, 1996.

[51] Int. Cl.$^6$ .................. F16L 23/08; F16L 23/12
[52] U.S. Cl. .................. 285/363; 285/415; 285/328; 285/367
[58] Field of Search .................. 285/415, 417, 285/363, 368, 411, 367, 328

[56] References Cited

U.S. PATENT DOCUMENTS

| | | | |
|---|---|---|---|
| 3,181,901 | 5/1965 | Watts | 285/367 |
| 3,761,114 | 9/1973 | Blakeley | 285/415 |
| 3,865,413 | 2/1975 | Mizusawa et al. | 285/367 |
| 4,119,335 | 10/1978 | Rifeelt et al. | 285/415 |
| 4,527,818 | 7/1985 | Rundell | 285/367 |
| 5,209,524 | 5/1993 | Corwon et al. | 285/415 |
| 5,468,025 | 11/1995 | Adinolff et al. | 285/415 |
| 5,641,185 | 6/1997 | Harth | 285/367 |

FOREIGN PATENT DOCUMENTS

| | | | |
|---|---|---|---|
| 2384195 | 11/1978 | France | 285/415 |
| 685502 | 7/1990 | France | 285/415 |
| 309656 | 4/1929 | United Kingdom | 285/367 |
| 1133351 | 4/1968 | United Kingdom | 285/415 |

*Primary Examiner*—Eric K. Nicholson
*Attorney, Agent, or Firm*—Paul J. Cook

[57] ABSTRACT

A flange structure formed from a plurality of joined flange segments is provided. The joined flange segments form a generally circular opening for a conduit. The generally circular opening has a perimeter formed from a first surface segment having discrete teeth and extending in a direction generally perpendicular to the faces and a second surface segment tapered toward one of the faces. The flange structure can be connected to a substrate by fasteners extending through two oval shaped openings connecting the two forces. At least one shim is attached to the flange segments about the circular opening. The shim has an inner surface with essentially the same surface configuration as the generally circular opening of the flange segments.

6 Claims, 5 Drawing Sheets

SEGMENTED FLANGE STRUCTURE INCLUDING A SHIM

REFERENCE TO RELATED APPLICATION

This application is a continuation-in-part of application Ser. No. 08/614,355, filed Mar. 12, 1996.

BACKGROUND OF THE INVENTION

This invention relates to a flange structure. More particularly, this invention relates to a flange structure utilized to replace damaged flanges such as flanges utilized to connect conduits.

At the present time, it is common to connect conduits with a flange on each conduit together with means for securing the flanges to each other. Automobile exhaust systems are an example of a system of connected conduits which utilize connecting flanges. These exhaust systems include a plurality of connected modules such as pipes, a catalytic converter and an exhaust muffler. The modules are provided with flanges to effect connection with an adjacently positioned module such as with bolts extending through the flanges which are secured with nuts.

As automobile exhaust systems are operated in a corrosive environment, particularly in winter conditions when the system is exposed to salt, moisture and sand, portions of the system, including the flanges become severely corroded to the extent that they become detached from an adjacent flange. When this condition occurs, repairs must be made so that connection of modules in the exhaust system can be reestablished in order to permit the system to function properly.

Oftentimes, it is not possible to repair the flange, thereby necessitating replacement of the entire module to which the flange is attached. This damaged flange condition also requires unnecessary expense since the remaining portion of the module, such as the exhaust muffler or catalytic converter can be in acceptable working order.

It has been proposed in U.S. Pat. 4,519,639 to provide a segmented hinged flange for a conduit. The flange segments are formed from laminated metal sheets which interleave with metal sheets of an adjacently positioned segment at the juncture points between segments. The segments surround a conduit to be attached to an adjacent conduit. The segments are joined by bolts extending through the laminated metal sheets at the juncture points. The joining bolts extend beyond the thickness of the segments and thus increase the effective thickness of the flange. This, in turn, limits the use of the flange to a relatively large volume of space to accommodate both the flange thickness and the added thickness of the added bolts. In addition, the interior size of the flange opening is not adjustable so that a wide size range of flange structures must be provided to accommodate a wide variety of conduit sizes.

U.S. Pat. 5,203,593 discloses a flexible exhaust coupling utilizing resilient annular gasket means designed to permit related movement between adjacent joined conduits.

U.S. Pat. 5,228,726 discloses an exhaust system clamp having flared flanges for connecting two conduits to permit axial expansion of the conduits during use.

U.S. Pat. Des. 263,415 discloses a design for a pipe coupling flange.

It would be desirable to provide a flange structure which can be attached to a conduit to accommodate conduits of varying sizes. It would also be desirable to provide such a flange structure including means for attaching the flange structure to a conduit, which occupies a minimum volume. In addition, it would be desirable to provide such a flange structure which can be secured to a slightly damaged conduit surface or to a conduit with a flared end while minimizing or preventing damage to the conduit

SUMMARY OF THE INVENTION

The present invention provides a flange structure formed from a plurality, usually two, mating flange segments, each having a means for connecting the segments together which can include one or more shims to accommodate varying size conduits. Each flange segment is provided with two generally flat faces and an opening connecting the flat faces for housing a means for connecting the flange structure to a substrate such as a second flange. Each flange segment is provided with a generally circular arc surface such as a semi-circular arc surface which when connected to at least one other flange segment forms a generally circular opening for housing a conduit or pipe having a generally circular outside surface. The means for connecting the segments comprises generally cylindrically shaped housings for accommodating a bolt or the like which extends between adjacent segments but does not extend through the generally flat faces.

The generally circular opening surface at a central portion of the joined segments has a perimeter, a portion of which is flared outwardly away from a central axis of the generally circular opening and a portion of which extends in a generally parallel direction to the central axis of the opening. The portion of the opening which extends in a generally parallel direction to the central axis of the opening can be provided with discrete teeth which extend toward the central axis of the opening. One or more shim sections are connected to the generally circular opening to provide a means for reducing the diameter of the opening. The shims have an exposed surface having essentially the same shape as the opening surface.

DESCRIPTION OF SPECIFIC EMBODIMENTS

The flange structure of this invention is formed by connecting a plurality, preferably two, flange segments with connecting means such as bolts or the like which extend between adjacent flange segments but which do not extend through the flat faces of the flange segments. Shim sections are provided which mate with the shape of a central opening formed by the flange segments. An exposed surface of the shim sections have essentially the same surface configuration as the surface of the central opening. By orienting the connecting means so that their central axis extends in a direction generally parallel to the planes of the flat flange segment surfaces rather than generally perpendicular to these planes, the connecting means do not increase the

3 effective thickness of the flange structure. If the connecting means were oriented so that they passed through the flat flange segment surface, the heads of the bolts as well as the nuts connecting the bolts would extend past the flat flange segment surfaces, thereby effectively increasing the flange structure thickness. This increased effective thickness undesirably increases the minimum volume into which the flange structure can be positioned.

Since the generally circular surface of the flange structure which surrounds a generally cylindrical conduit or pipe, has a tapered surface section and a generally cylindrical section, the flange structure of this invention can accommodate a wide variety of conduits or pipes. For example, conduits having a flared end can be fitted with the tapered surface section of the flange structure. In addition, conventional cylindrical conduits can be fitted with the cylindrical surface section. In addition, the cylindrical surface section can be provided with discrete teeth extending away from the cylindrical surface section. The shim sections which are secured to the generally circular surface of the flange structure has an exposed surface with a tapered surface section and a generally cylindrical surface having discrete teeth. The discrete teeth provide increased frictional force of the flange structure including one or more shims, each formed from a plurality of shim sections on the outside surface of the conduit, particularly when the outside conduit surface has become irregular due to mild corrosion or bending. In contrast, a continuous threaded surface would not provide such an increased frictional force, and, in fact, would promote undesirable rotation of the flange structure about the conduit.

Figure 1:
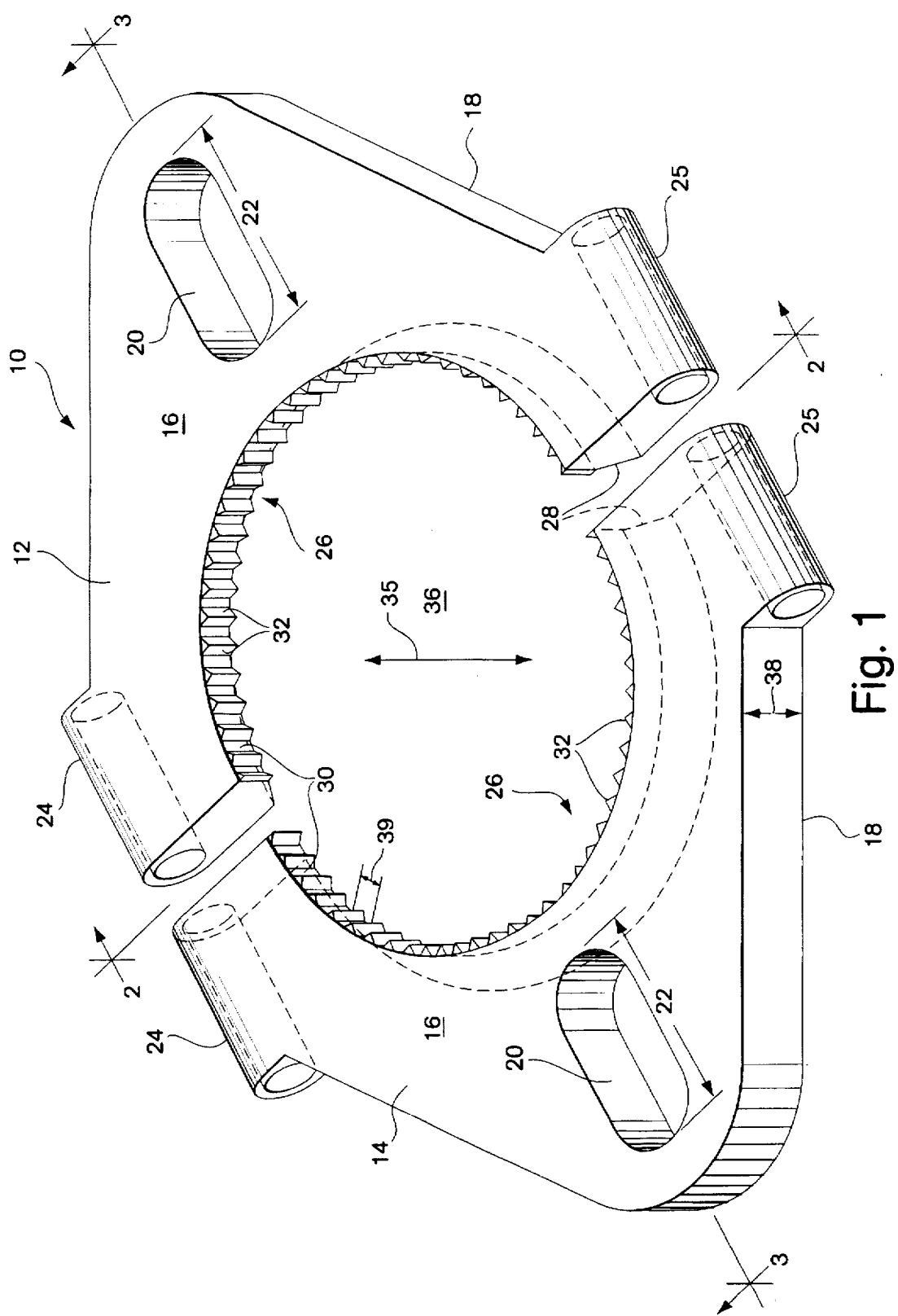
FIG. 1 is a perspective exploded view of a flange structure utilized in this invention.
Figure 2:
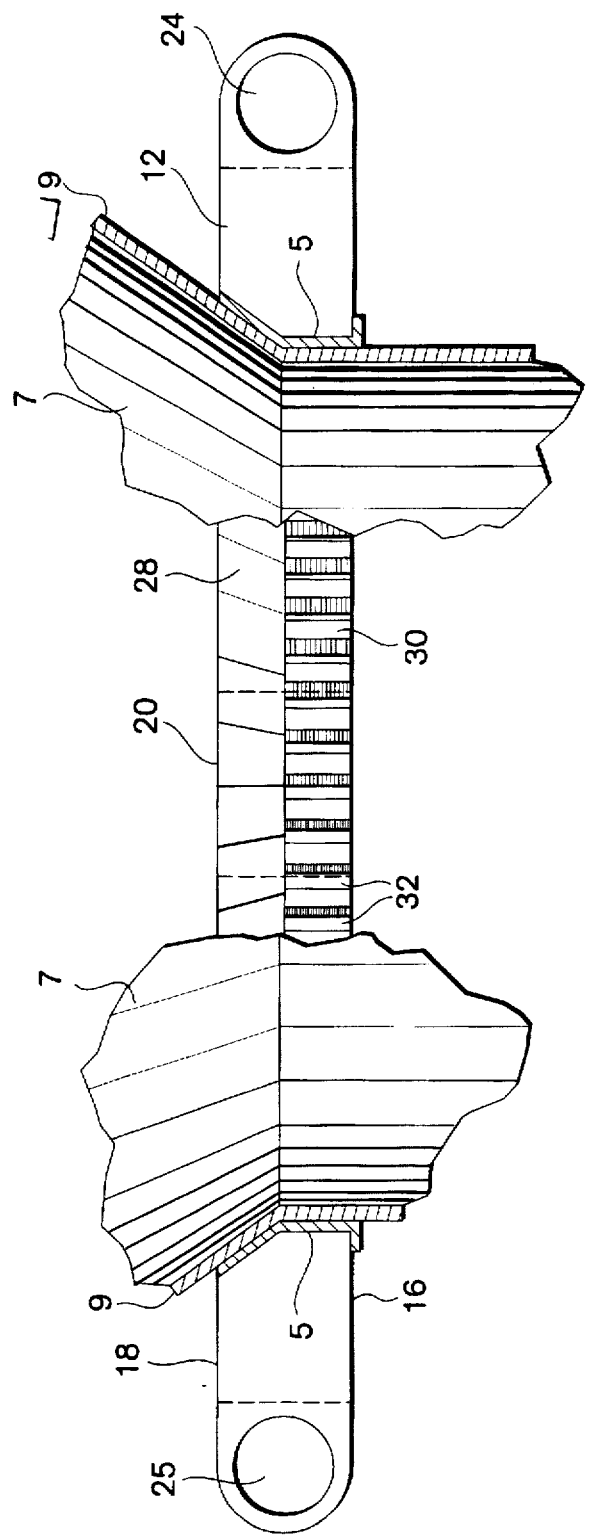
FIG. 2 is a cross-sectional view of the flange structure of FIG. 1 taken along line 2—2 of FIG. 1 including a shim and a portion of a pipe in cross-section.
Figure 3:
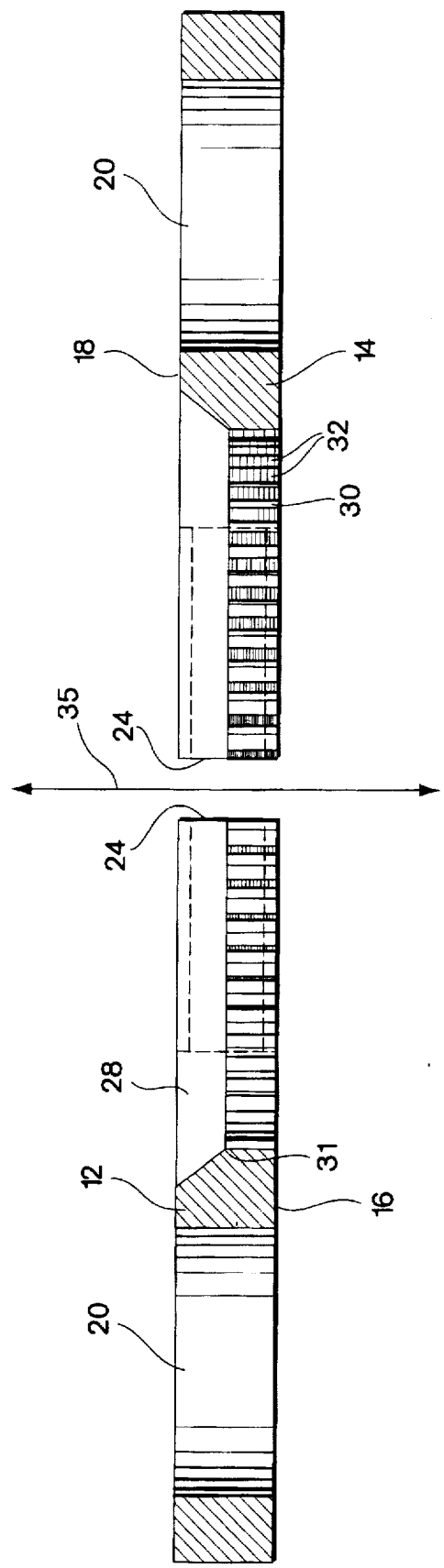
FIG. 3 is a cross-sectional view of the flange structure of FIG. 1 taken along line 3—3 of FIG. 1.

Referring to FIGS. 1, 2 and 3, the flange structure forming a part of the apparatus of this invention 10 is formed from two flange segments 12 and 14, each having two relatively flat surfaces 16 and 18. The oval shaped openings 20 are shaped to accommodate a stem of a fastening device (not shown) such as a bolt, screw or the like. The oval openings are sized so that a conventional head (not shown) of the fastening device is sized to be positioned on surface 16 or 18 while the stem of the fastening device is sized to extend through oval openings 20 and be positioned along the length 22 of opening 20. The oval openings 20 permit adjustment of the position of flange segments 12 and 14 to permit positioning on a conduit having a range of diameters. Each flange segment 12 and 14 is provided with generally cylindrical openings 24 and 25 through which fit conventional fasteners such as bolts or the like in order to secure flange segments 12 and 14 together.

Each flange segment 12 and 14 is provided with a generally circular arc surface 26 having a tapered surface section 28 and a generally cylindrical surface section 30. The cylindrical surface section 30 is provided with discrete teeth 32. The tapered section 28 of the flange segments 12 and 14 permits the flange segments 12 and 14 to be positioned about a shim 11 a conduit 13 having a flared end 15. The cylindrical section 30 of flange segments 12 and 14 permits the flange segments 12 and 14 to be fit about a conduit having a generally cylindrical outside surface. The discrete teeth 32 permit the flange segments 12 and 14 to be positioned about a nonuniform generally cylindrical conduit while preventing their rotation about the conduit due to frictional forces exerted by the teeth. In contrast, a continuous threaded surface does not provide the desired frictional retaining force and, in fact, promotes rotation of the flange about the conduit to which it is attached.

The flange segments, when utilized without one or more shims, are secured about a conduit by virtue of forces exerted by fastening means such as a bolt and nut extending through the generally cylindrical openings 24 and 25. The flange segments 12 and 14 need not contact each other so that the diameter of the central opening 36 formed by the flange segments 12 and 14 can be adjusted to accommodate conduits of varying diameter. The opening 36 has a central axis 35 which extends generally parallel to the width 37 of the cylindrical surface section 30.

Figure 4:
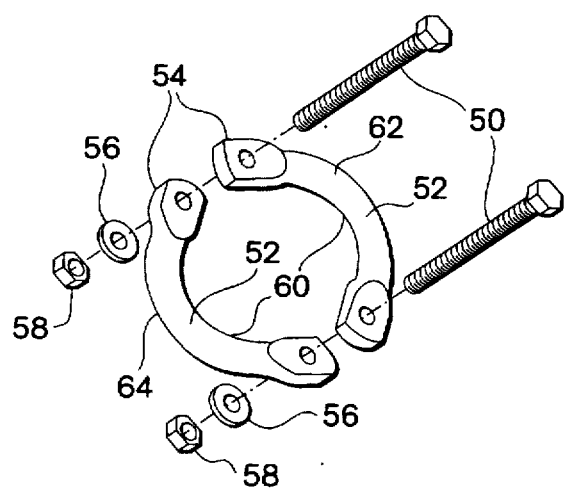
FIG. 4 is a perspective view of a flange structure of the prior art.

Since fastening means extend through generally cylindrical opening 24 and 25, the fastening means (not shown) do not increase or significantly increase the effective thickness 38 of the flange segments 12 and 14. Thus, the formed flange structure can be positioned within a volume having a maximum thickness as small as the thickness 38 of the flange structure 10. In contrast, the flange of the prior art (FIG. 4) having fastening means extending through the generally flat surfaces 52 and 54 have an increased effective thickness defined by the increased length added by the fastener 50 including washer 56 and nuts 58. In addition, the inner surfaces 60 of the flange segments 62 and 64 each a tapered section and a cylindrical section so that it is not practical for use with a conduit having a variety of outside surface shapes.

Figure 5:
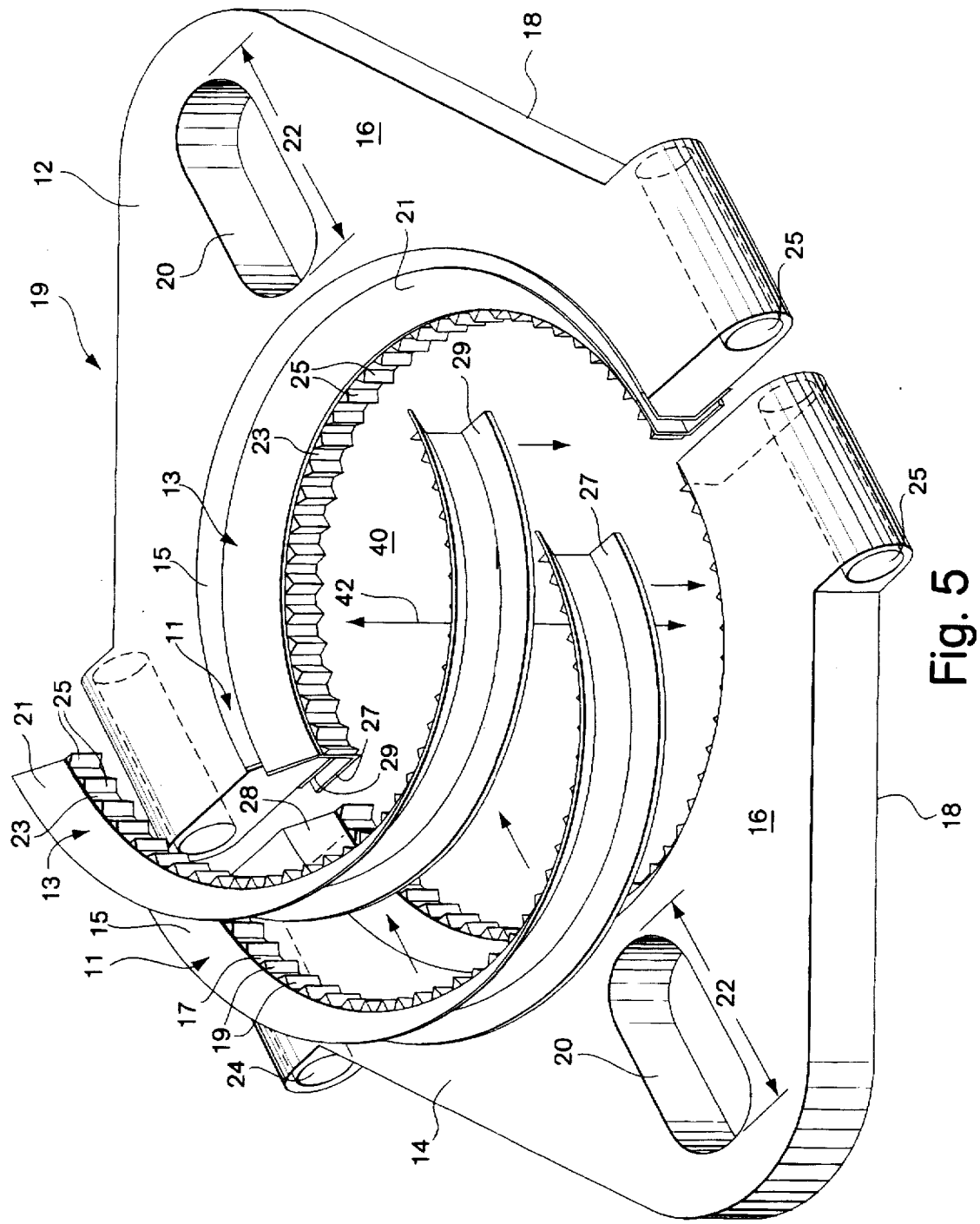
FIG. 5 is a perspective exploded view of a flange structure and shim sections of this invention.

Referring to FIG. 5, the flange structure portion of this invention 9 is formed from two flange segments 12 and 14, each having two relatively flat surfaces 16 and 18. The oval shaped openings 20 are shaped to accommodate a stem of a fastening device (not shown) such as a bolt, screw or the like. The oval openings are sized so that a conventional head (not shown) of the fastening device is sized to be positioned on surface 16 or 18 while the stem of the fastening device is sized to extend through oval openings 20 and be positioned along the length 22 of opening 20. The oval openings 20 permit adjustment of the position of flange segments 12 and 14 to permit positioning on a conduit having a range of diameters. Each flange segment 12 and 14 is provided with generally cylindrical openings 24 and 25 through which fit conventional fasteners such as bolts or the like in order to secure flange segments 12 and 14 together.

Each flange segment 12 and 14 is provided with a generally circular arc surface 26 having a tapered surface section 28 and a generally cylindrical surface section 30. The generally cylindrical surface section 30 is provided with discrete teeth 32. The shim sections 11, like the flange segments 12 and 14 include a flared segment 15 and a generally cylindrical surface section 17 provided with teeth 19. Likewise, the shims section 13 include a flared segment 21 and a generally cylindrical surface section 23 having teeth 25. The shim sections 11 include a flange 27 to permit them to fit about the flange segments 12 and 14. The shim sections 13 include a flange 29 to permit them to fit about the shim sections 11. The tapered sections 21 and 15 of the shim segments 11 and 13 permits the flange structure 9 and 14 to be positioned about a conduit having a flared end. The cylindrical sections 30, 17 and 23 permit the flange segments 12 and 14 and shim sections 11 and 13 to be fit about a conduit having a generally cylindrical outside surface. The discrete teeth 25 of the innermost shim sections 13 permit the flange structures 9 to be positioned about a nonuniform generally cylindrical conduit while preventing its rotation about the conduit due to frictional forces exerted by the teeth. In contrast, a continuous threaded surface or a smooth surface does not provide the desired frictional retaining force and, in fact, promotes rotation of the flange about the conduit to which it is attached.

The flange structure 9 is secured about a conduit by virtue of forces exerted by fastening means such as a bolt and nut extending through the generally cylindrical openings 24 and 25. The flange segments 12 and 14 need not contact each other so that the diameter of the central opening 40 formed by the flange segments 12 and 14 can be adjusted to accommodate conduits of varying diameter. The opening 46 has a central axis 42 which extends generally parallel to the width of the cylindrical surface section 23.

As shown in FIG. 5, a plurality of shim sections 11 and 13 to form a plurality of shims can be utilized. It is convenient to form the shims sections having 1/16 inch thick so that a shim layer reduces the diameter of opening 40 by 1/8 inch from that of the joined flange segments 12 and 14. It is convenient to utilize from one to three shims for a flange structure 10 of a given diameter. Typically, the diameter of the central hole of the flange structure with shims can range from about 1 inch to about 5 inches to accommodate a wide variety of conduit diameters.

I claim:

1. A flange structure capable of surrounding and contacting a variety of pipe shapes which comprises:

a plurality of joined flange segments each having two faces, each of said segments having a first inner surface shaped as a generally circular arc, said first inner surface having a first surface segment having discrete teeth and extending in a direction parallel to a central axis of said arc and a second surface segment joined directly to said first surface segment to form a continuous surface, said second surface segment being tapered away from said central axis of said arc toward one of said faces so that said first surface segment and said second surface segment form said inner surface which directly contacts a pipe positioned within said inner surface, fastening means for fastening said flange segments together, said fastening means extending in a direction perpendicular to said central axis, at least one shim attached to said first inner surface, said at least one shim having a second inner surface having essentially the same shape as said first surface segment and said second surface segment, and means for attaching said flange structure to a substrate.

2. The flange structure of claim 1 formed from two flange segments.

3. The flange structure of claim 1 formed from three flange segments.

4. The flange structure of claim 1 wherein said means for attaching comprises two oval shaped openings extending between said two faces.

5. The flange structure of claim 2 wherein said means for attaching comprises two oval shaped openings extending between said two faces.

6. The flange structure of claim 3 wherein said means for attaching comprises two oval shaped openings extending between said two faces.

* * * * *